June 29, 1948.  L. PEREIRA  2,444,267
AUTOMATIC SOLDERING IRON FEEDING ATTACHMENT
Filed Aug. 9, 1944
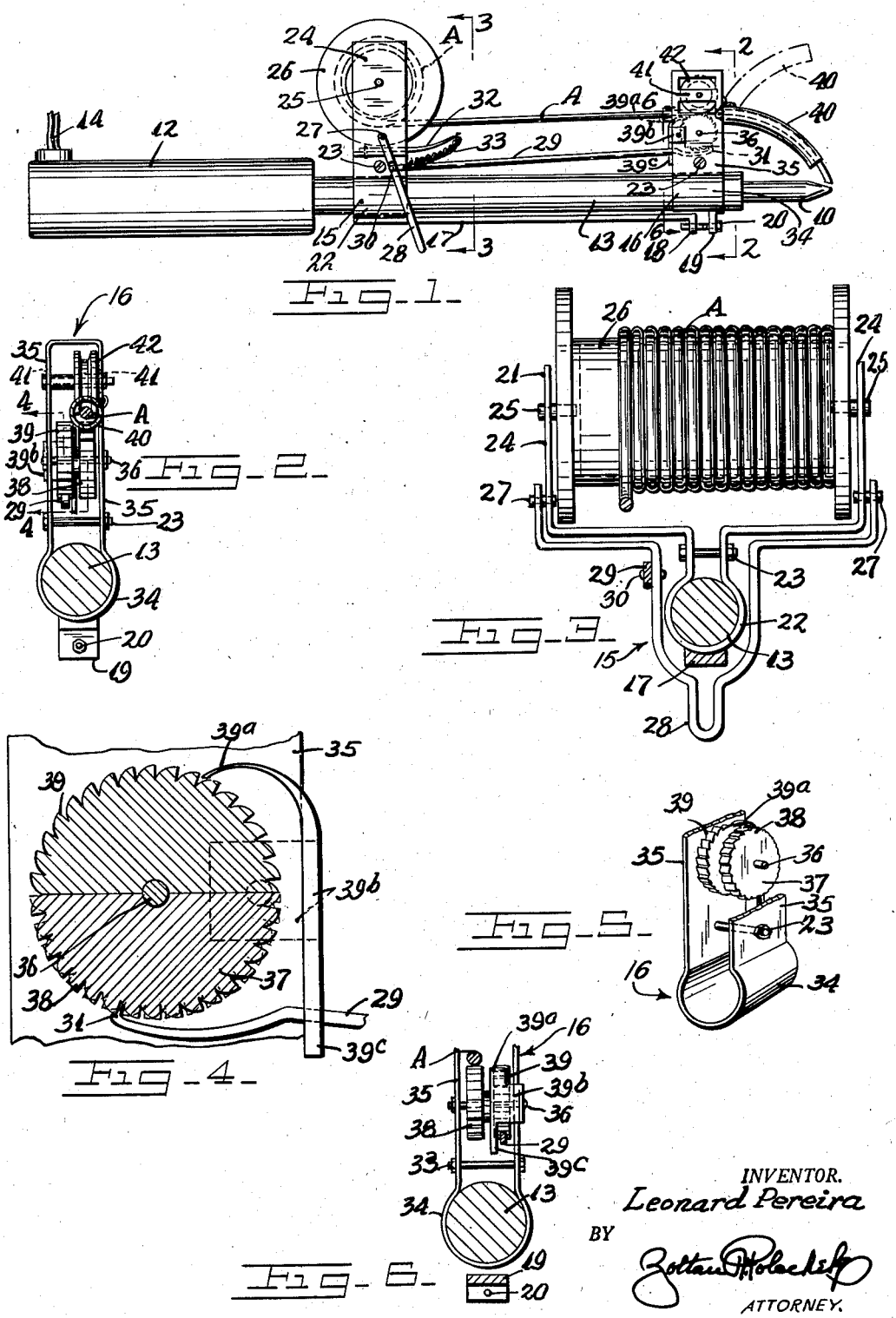
INVENTOR.
Leonard Pereira
BY
ATTORNEY.

Patented June 29, 1948

2,444,267

UNITED STATES PATENT OFFICE 2,444,267

AUTOMATIC SOLDERING IRON FEEDING ATTACHMENT

Leonard Pereira, Astoria, N. Y.

Application August 9, 1944, Serial No. 548,735

2 Claims. (Cl. 113—109)

This invention relates to new and useful improvements in a soldering iron.

More specifically, the present invention relates to a soldering iron for continuously feeding solder wire to the iron as the soldering operation is being carried on.

Still further it is proposed to provide a soldering iron as aforesaid having a compound ratchet and solder feed wheel.

A further object is to provide a wheel as aforesaid which is adjustable for adjustment of the feeding of the solder wire.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevation of the soldering iron constructed in accordance with this invention.

Fig. 2 is an enlarged section on the line 2—2 of Fig. 1.

Fig. 3 is an enlarged section on the line 3—3 of Fig. 1.

Fig. 4 is an enlarged section on the line 4—4 of Fig. 2.

Fig. 5 is an enlarged fragmentary perspective view of the wheel support of the soldering iron.

Fig. 6 is another enlarged fragmentary sectional view taken on line 6—6 of Fig. 1.

The soldering iron, according to the invention, comprises the soldering point 10 carried by a bar 13, having a handle 12 on its rear end. The point 10 is heated in the usual manner by electrical heating means not shown, which are supplied with electrical current through the wires 14, which extend from the handle 12.

A pulley support 15 is adjustably mounted on the bar 13 adjacent the handle 12 and a toothed wheel support 16 is mounted on the bar adjacent the point 10. A plate 17 secured at one end to the bottom of the support 15 as by welding, extends to the support 16 and terminates in a depending lug 18 having a threaded orifice. A similar lug 19 having an unthreaded orifice depends from the support 16 and an adjusting screw 20 extends through the orifice of lug 19 and is screwed into the orifice of lug 18. By turning this screw 20, the distance between supports 15 and 16 may be adjusted for a purpose presently to appear.

Support 15 includes a bent sheet metal frame 21 having a cylindrical portion 22 extending around bar 13, plate 17 being secured to the bottom part of this portion 22. A bolt 23 extends through the frame above the bar 13 and secures the portion 22 tightly on the bar preventing movement of the portion along the bar except when desired to adjust the position of the support 15. The frame also includes two upstanding arms 24 in each of which is secured an inwardly extending pin 25. A spool 26 for a roll of soldering wire A is rotatably freely mounted on this spool. An outwardly extending pin 27 is secured to each arm 24 below pin 25 thereof and a lever 28 is pivotally supported from these pins 27, lever 28 extending below and around the portion 22. The spool 26 may be horizontally or vertically mounted, it being shown horizontally mounted.

A pawl and ratchet finger 29 is pivotally secured to lever 28 below pins 27 by a bolt 30, the finger extending to the support 16 and having a rearwardly and upwardly extending tooth 31 at its forward end. A spring support 32 is secured to the frame 21 at an arm 24 adjacent the finger 29 and a tension spring 33 is secured at one end to the forward end of support 32 and at its rear end to the finger 29 for urging the finger upwardly and forwardly.

The support 16 includes a cylindrical portion 34 slidably disposed on the bar 13, the lug 19 depending from the bottom of this portion 34. Two side walls extend upwardly from this portion 34. A shouldered bolt 36 is secured to the side walls 35 at the middle thereof. A wheel 37 is rotatably mounted on bolt 36. Wheel 37 has two rows of teeth, the row of teeth 38 being sharp and turned forwardly and the other row of teeth 39 being turned rearwardly. A tube 40 is hinged to the walls 35 and extends forwardly and downwardly in a curve toward the forward end of point 10. This tube may be swung around its hinge for adjustment. The solder wire A from the spool 26 passes through this tube 40 and is guided to the point 10 so that it engages the forward tip of the point 10. The teeth 38 engage the soldering wire A. The tooth 31 of finger 29 is in engagement with the teeth 39 at the bottom of the wheel. Spring 33 pulls the finger 29 forwardly and upwardly, as aforesaid, holding the tooth 31 in engagement with the teeth 39. A retaining spring 39ª is supported on a bracket 39ᵇ and prevents the wheel 37 from rotating backwards. A lower projection 39ᶜ acts as a guide for keeping the finger 29 and the tooth 31 in alignment with the teeth 39 of the wheel 37.

Each side wall 35 has two openings providing a strip 41 therebetween. A cone-shaped roller 42 is journalled to these strips and its position may be adjusted by bending the strips to take up the wear. This roller presses the wire A against the teeth 38. The amount of pressure may be changed by bending the strip 41 either toward or away from the teeth 38.

The operation of the soldering iron is as follows:

The user of the soldering iron holds the handle 12 in his hand. When the electric current has heated the point 10 to a certain proper temperature for melting the solder, the solder wire A adjacent the point 10 is melted and the user can then perform a soldering operation in the usual manner. When more molten solder is needed, the user can engage the lever 28 with his finger, and pull it backward.

The finger tooth 31, engaging the teeth 39, will rotate the wheel 37, the teeth 38 engaging the soldering wire A and moving it forward to supply a fresh portion of the forward end of the soldering wire A to the point 10 at the tip thereof. The user can regulate the amount of solder moved forward by the extent that he pulls the lever 28 rearward. However, as it is more accurate to pull the lever 28 rearward to its full extent each time more solder is needed, the amount of solder moved forward can be adjusted by means of the screw 20. For instance, if more solder is needed, the screw 20 can be tightened up to move support 16 toward support 15. This causes the tooth 31 to engage a tooth 39 forwardly of the tooth it was engaging and thereby increasing the rotation of the wheel 37 for each rearward movement of the lever.

When the lever is released, the spring 33 pulls it forwardly, the tooth 31 slipping back over the teeth 39 in the usual manner of a ratchet. The tube 40 is preferably of soft material such as copper or aluminum, so that it can be bent to most properly guide the wire A.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A soldering iron comprising a handle, a soldering point, a bar connecting said handle and point, a frame secured to said bar adjacent said handle, rotatable mounting means for a spool of wire solder in said frame, a lever fulcrummed adjacent its top to said frame, a support mounted on said bar adjacent said point, a plate connected at its rear end to said frame and extending forwardly toward said support, said plate and said support having orificed depending spaced aligned lugs, a screw in said lug orifices for regulating the distance between said frame and support, a wheel pivotally mounted on said support on the same side of said bar as said spool, said wheel having a row of ratchet teeth and a row of wire-moving teeth, and a ratchet finger pivoted to said lever intermediate its ends and extending to and engaging said ratchet teeth for rotating said wheel, the degree of rotation of said wheel by one movement of said lever being adjustable by said regulation of the distance between said frame and support, providing a space for solder wire extending over said wire-moving teeth in engagement therewith and having its forward end disposed adjacent said point for melting when said point is heated, said wire-moving teeth being adapted to move such wire toward said point as it is melted, by movement of said lever.

2. In combination, a soldering iron having a bar provided with a handle on one end and a soldering point on the other end, a bracket support mounted on the forward end of the bar adjacent the point, a bracket support mounted on the rear end of the bar adjacent the handle, a tooth wheel mounted to turn on the first bracket support, a feed tube supported on said first bracket support for directing the end of a length of soldering wire toward the soldering point, a reel mounted on the second bracket support for a coiled supply of soldering wire, another toothed wheel mounted to turn with the first toothed wheel for feeding soldering wire into the feeding tube, a pawl for actuating the second-named toothed wheel, a rod connected with the pawl and extending rearwardly to the second-named bracket support, a spring actuated lever pivotally mounted on the second-named bracket support and pivotally connected with said rod, a bar connected with the second-named bracket support, a lug on the first-named bracket support, and a screw adjustably connecting the lug and the bar to adjust the spacing of the bracket supports on the first bar.

LEONARD PEREIRA.

REFERENCES CITED

The following references are of record in the file of this patent:

UNITED STATES PATENTS

| Number | Name | Date |
|---|---|---|
| 490,256 | Meitzler | Jan. 17, 1893 |
| 1,540,859 | Plicque | June 9, 1925 |
| 1,691,052 | Fay | Nov. 13, 1928 |
| 1,893,093 | Linville et al. | Jan. 3, 1933 |
| 2,125,781 | Harris | Aug. 2, 1938 |
| 2,195,944 | Stream | Apr. 4, 1940 |
| 2,251,557 | Weston | Aug. 5, 1941 |

FOREIGN PATENTS

| Number | Country | Date |
|---|---|---|
| 481,669 | Great Britain | Mar. 15, 1938 |